Dec. 16, 1930.  W. STUEBING, JR  1,785,369
LIFT TRUCK
Filed Oct. 14, 1927  2 Sheets-Sheet 1
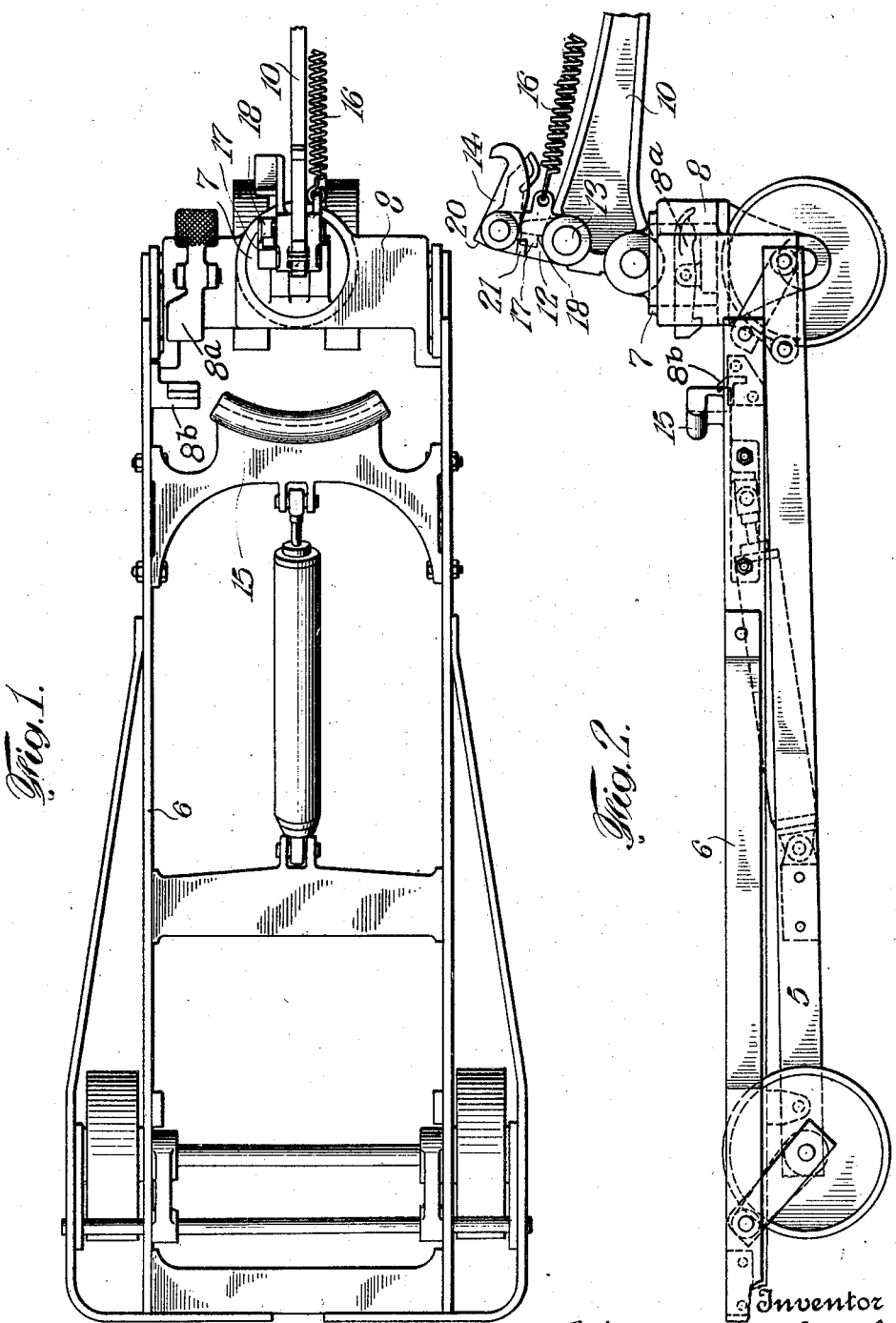
Inventor
William Stuebing Jr.
By his Attorneys Dec. 16, 1930.  W. STUEBING, JR  1,785,369
LIFT TRUCK
Filed Oct. 14, 1927  2 Sheets-Sheet 2
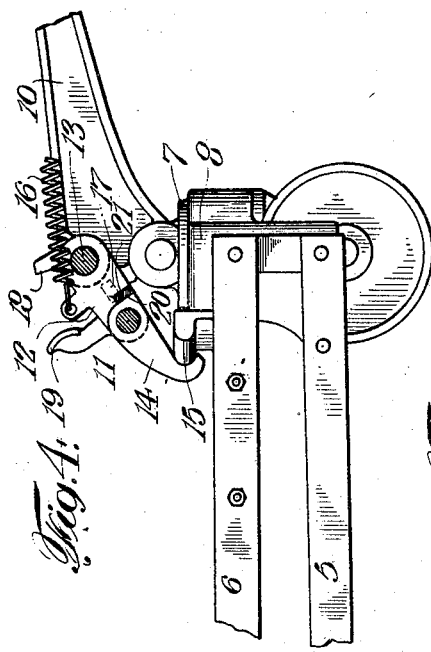
Fig.1.
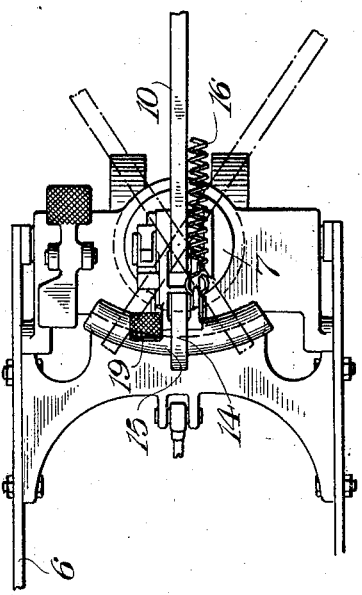
Fig.2.
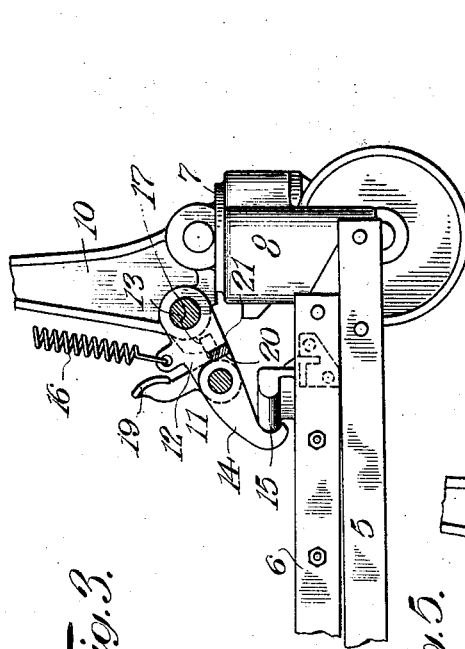
Fig.3.
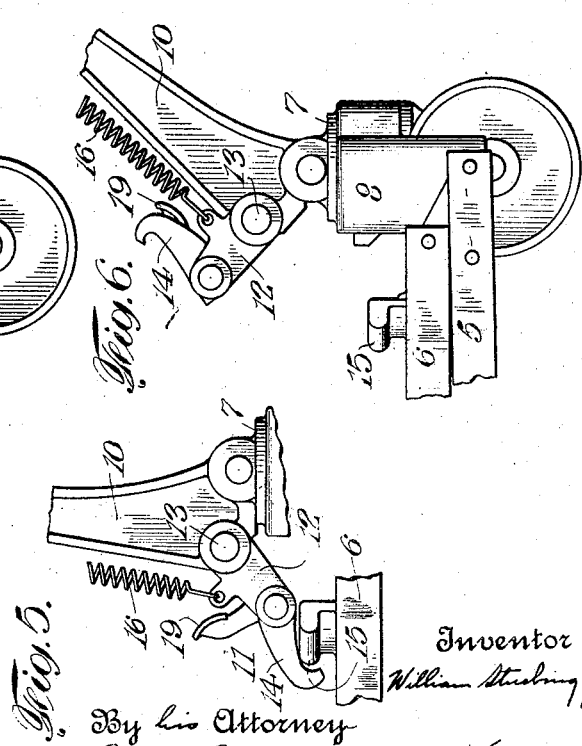
Fig.6.
Fig.5.
Inventor
William Stuebing Jr
By his Attorney
Emery, Booth, Janney & Varney.

Patented Dec. 16, 1930

1,785,369

UNITED STATES PATENT OFFICE

WILLIAM STUEBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

LIFT TRUCK

Application filed October 14, 1927. Serial No. 226,072.

The present invention relates to lifting trucks of the type in which a steering lever is operative to lift the load and has for an object to provide an improved lifting mechanism and generally to provide an improved truck.

The nature and objects of the invention will be better understood from the consideration of a particular illustrative embodiment thereof, for the purpose of which description reference should be had to the accompanying drawings, forming a part hereof and in which—

Figure 1 is a plan view of a lifting truck embodying the invention.

Figure 2 is a side view of the same showing the elevating frame in its lower position and the lifting mechanism disconnected therefrom.

Figure 3 is a fragmentary view in side elevation showing the elevating frame in its lower position but with the lifting link connected thereto.

Figure 4 is a similar fragmentary view but showing the elevating frame raised but with the lifting link still connected thereto.

Figure 5 is a detail view indicating the position of the parts of the compound lifting link during the making of the connection between the steering handle and the elevating frame for raising the latter.

Figure 6 is a similar fragmentary view showing the elevating frame in its upper position but with the lifting means disconnected therefrom and the steering lever in steering position, and Figure 7 is a fragmentary plan view indicating the manner of connecting the lifting mechanism for raising the load when the steering handle is turned to one side.

The truck shown for the purposes of illustrating the invention has a main frame 5 and a load supporting or elevating frame 6 carried thereby. A steering head 7 is swivelled in a transverse yoke 8 forming a part of the main frame with a steering lever 10 pivoted to the steering head 7 to swing in a vertical plane relative thereto. Suitable means is provided for connecting the steering lever and the elevating frame for raising the latter by a vertical swinging movement of the former; and suitable means is also provided for automatically locking the elevating frame to the main frame when the elevating frame reaches its elevated position, as, for example, the conventional locking hook 8a mounted on the main frame and the cooperative member 8b fixed to the elevating frame. As usual, the hook 8a may be manually released to permit the elevating frame to descend to its lower position.

It is one of the advantages of the invention that in operation the so-called "whipping handle" is avoided. In the use of a lifting truck, if the load to be lifted is heavy, the operative commonly steps on the front of the truck and, lifting his body, throws his whole weight on the cross bar at the upper end of the steering lever or handle to swing the same downward and raise the elevating frame. In many lifting trucks as now constructed, it is possible for the means connecting the steering lever to the elevating frame to become disconnected as the operative rises and throws his weight on the cross bar, whereby the steering lever moves downward freely without lifting the load causing the so-called "whipping handle" and gives the operative a dangerous fall.

In the arrangement to be described provision is made for automatically maintaining the connecting means in engagement when the steering lever is vertical and the elevating frame is in its lowermost position to avoid the "whipping handle." As shown the connection between the steering lever and the elevating frame for lifting the latter comprises an extensible compound link pivoted to one part, preferably the steering lever, and manually engageable with the other part. As shown, the compound link 11 comprises a link 12 pivoted to the steering lever at 13 and carrying at its free end a hook member 14 arranged to engage an arcuate hook member 15 carried by the elevating frame 6 and preferably rigid therewith. The arcuate hook 15 is so constructed that the center of the arc on which it is formed lies substantially in the center line of the axis of the steering head when the elevating frame 6 is in its lowermost position. The compound link 11 may therefore be engaged with said arcuate hook 15 in different steering positions of the steering head to provide what is known as a side-lift, that is to say, to permit raising the elevating frame when the steering head and the steering lever are in different steering positions more or less at one side of the central longitudinal axis of the truck.

In the arrangement illustrated, the arcuate hook member 15 extends upwardly from the elevating frame 6 and the compound link 11 moves downward into engagement therewith but obviously this arrangement is merely illustrative. As shown the link 12 of the compound link 11 is normally urged upward to inoperative or disconnected position by a spring 16, the upward movement being limited by interengaging lugs 17 and 18 carried respectively by the link 12 and the steering lever 10. The downward movement of the hook member 14 relative to the link 12 is limited by the engagement of the shoulder 20 of the hook member with the lug 21 on the link whereby under certain conditions the hook member will be raised with the link 12 by the spring 16. The extent of movement of the hook member in the opposite direction about its pivot is preferably such that when disconnected from the elevating frame and when the steering lever is in normal steering position, the hook member will lie folded back toward the steering lever, as indicated in Fig. 6, thereby being positioned where it will not engage the elevating frame or the load thereon, but it is so balanced that when the steering lever is in vertical position and the link 12 is moved downward as by means of the pedal 19 formed thereon said hook member will gravitate into position to engage the arcuate hook member 15 of the elevating frame. This arrangement makes possible a relatively short truck in which the load may be carried well forward and close to the steering head.

The described arrangement constitutes in effect an extensible link wherein the maximum distance between the pivot 13 and the bend of the hook 14 is equal to or greater than the maximum distance between the pivot 13 and the engaged side of the arcuate hook member 15 when the steering lever is in the upright position and the elevating frame down to permit making lifting engagement and the minimum distance between the pivot 13 and the bend of the hook 14 is less than the minimum distance between the pivot 13 and the engaged side of the arcuate hook 15 to cause the engagement to be maintained. By this arrangement the whipping handle is avoided, for, although the link 12 will be urged upward by the spring 16, nevertheless the hook member 14 will retain its engagement with said hook and the action of the spring 16 will merely cause a taking up of the slack in the extensible link by flexing the two parts thereof relative to each other.

Inasmuch as the link 12 and pedal 19 swing laterally with the steering lever, the pedal is always in convenient position for operation.

The movement of the link 12 and the hook member 14 when making the connection between the steering lever and the elevating frame for raising the latter is indicated in Fig. 5. When the operative puts his foot on the pedal pushing the link downward against the action of the spring 16 the point of the hook will engage the arcuate hook 15 but as the link 12 continues to move down the hook member 14 moving pivotally about its point of connection to the free end of the link 12 will, in effect, extend the connecting link considered as a whole until the hook member 14 rides over and falls into hooked engagement with the arcuate hook 15 to make the connection. The engaged position while the operative's foot is still resting on the pedal 19 is shown in full lines in Fig. 5. As the operative removes his foot from the pedal 19, the link 12 will move upwardly to the position shown in Fig. 3 but the gravity actuated hook member 14 will remain in engagement with the hook 15 and because of the shape of the hook end, the spring 16 will not cause a disengagement. Accordingly it is not necessary to hold the steering lever forward of its rearmost position as is usual practice in operating trucks of certain types.

After the elevating frame is raised by the downward swing of the steering lever, and the locking hook 8a has engaged the holding member 8b a backward movement of the steering lever 10 permits the spring 16 to lift the connecting link as a whole to disconnect it from the elevating frame, and as the movement of link 12 is arrested by the engagement of the lugs 17 and 18 the hook member 14 is thrown into its folded back position shown in Fig. 6.

The foregoing description of a particular embodiment is illustrative merely and is not intended as defining the limits of the invention.

I claim:

1. A lifting truck comprising in combination an elevating frame, a steering lever arranged to swing in a vertical plane, and means for connecting the steering lever and the elevating frame to raise the latter comprising an extensible link connected to one part and arranged to be manually engaged with the other part.

2. A lifting truck comprising in combination an elevating frame, a steering lever arranged to swing in a vertical plane, and means for connecting the steering lever and the elevating frame to raise the latter comprising an extensible link connected to one part and arranged to be manually engaged with the other part, and means for automatically maintaining engagement of said parts when the steering lever is in upright position.

3. A lifting truck comprising in combination an elevating frame, a steering lever arranged to swing in a vertical plane, and means for connecting the steering lever and the elevating frame to raise the latter comprising an extensible link connected to one part and arranged to be manually engaged with the other part, said extensible link permitting a limited free movement of the steering lever while maintaining the connection.

4. A lifting truck comprising in combination an elevating frame, a steering lever arranged to swing in a vertical plane, and a link for connecting the steering lever and the elevating frame for raising the latter and means to permit limited contraction and extension of the link to maintain connection between said lever and said frame during small backward movement of the steering lever while the elevating frame is in its lowermost position but arranged to permit disengagement upon greater backward movement of the steering lever when the elevating frame is in raised position.

5. A lifting truck comprising in combination an elevating frame, a steering lever arranged to swing in a vertical plane, and means for connecting the steering lever and the elevating frame for raising the latter comprising a link pivoted to one of the parts and a hook member movably connected to said link and arranged to be connected to and disconnected from the other parts, and means for locking the hook member in connected relation to the part engaged by it when the elevating frame is in its lowermost position but permitting disengagement when the elevating frame is in raised position.

6. A lifting truck comprising in combination an elevating frame, a steering lever arranged to swing in a vertical plane, and means for connecting the steering lever and the elevating frame for raising the latter comprising a lifting link normally tending to move out of connected position, and means to lock the link in connected position when the elevating frame is in lowermost position.

7. A lifting truck comprising in combination an elevating frame, a steering lever arranged to swing in a vertical plane, and means for connecting the steering lever and the elevating frame for raising the latter comprising a lifting link carried by one part and manually engageable with the other part, and means to maintain the connection between the lifting link and the second part when made to prevent accidental disconnection upon backward movement of the steering lever while the elevating frame in its lowermost position.

8. A lifting truck comprising in combination an elevating frame, a steering lever arranged to swing in a vertical plane, and means for connecting the steering lever and elevating frame for raising the latter carried by one part and arranged to be manually engaged with the other part, and means for automatically maintaining said means in engaged or disengaged relation to said other part.

9. A lifting truck comprising in combination an elevating frame, a steering lever arranged to swing in a vertical plane, and means for connecting the steering lever and the elevating frame for raising the latter comprising an extensible lifting link carried by the steering lever, and means to permit engagement of said link with the elevating frame in different steering positions of the steering lever.

10. A lifting truck comprising in combination an elevating frame, a steering lever arranged to swing in a vertical plane, and means for connecting the steering lever and the elevating frame for raising the latter comprising an arcuate member carried by the elevating frame and an extensible lifting link carried by the steering lever and engageable with said arcuate member in different steering positions of the steering lever together with means tending normally to move said lifting link into inoperative position.

11. A lifting truck comprising in combination an elevating frame, a steering lever arranged to swing in a vertical plane, and means for connecting the steering lever and the elevating frame for raising the latter comprising a link carried by the steering lever, means tending normally to raise said link to inoperative position, a hook member pivoted to the free end of said link, means for limiting the downward movement of said hook relative to said link, said hook member being engageable with the elevating frame upon downward movement of said link.

12. A lifting truck comprising in combination an elevating frame, a steering lever arranged to swing in a vertical plane, and means for connecting the steering lever and the elevating frame for raising the latter comprising a link pivoted to the steering lever, a spring tending normally to raise said link, a hook member pivoted to the free end of said link means for limiting the downward movement of said hook relative to said link, the construction and arrangement of said link and hook being such that when the link is moved downwardly the hook member engages the elevating frame and is retained in engagement therewith against the action of said spring.

13. A lifting truck comprising in combination an elevating frame, a steering lever arranged to swing in a vertical plane, and means for connecting the steering lever and the elevating frame for raising the latter comprising an arcuate hook member carried by the elevating frame and a jointed lifting link carried by said steering lever and engageable with said arcuate hook member in different steering positions of the steering lever, together with a spring connected to said link and tending normally to hold said link in inoperative position, said spring being inoperative to disconnect said lifting link from said hook member when the elevating frame is in lowermost position.

14. A lifting truck comprising in combination an elevating frame, a steering lever arranged to swing in a vertical plane, and means for connecting the steering lever and the elevating frame for raising the latter comprising a two part foldable link carried by the steering lever.

15. A lifting truck comprising, in combination, a main frame, an elevating frame mounted thereon and arranged to be upwardly movable relatively thereto, a steering swivel mounted upon said main frame, a steering lever pivotally mounted upon said steering swivel and provided with a rearwardly extending lifting member arranged to be moved by said steering lever to raise said elevating frame, means rigidly mounted upon said elevating frame provided with a surface extending a substantial distance to the right and left of the longitudinal center line of said elevating frame and so positioned as to be in the operative path of the free end of said lifting member when the latter is operated to raise said elevating frame whether said lifting member be operated to the right or left of said center line, whereby said lifting member may engage said surface at various points to raise said elevating frame when said steering lever is operated to the right or left of its straight forward position, and means for automatically maintaining connection between said surface and said lifting member while the elevating frame is in its lowermost position and for automatically effecting disengagement of said member from said surface upon upward movement of the steering lever when the elevating frame is in raised position.

16. A lifting truck comprising, in combination, a main frame, an elevating frame mounted thereon and arranged to be longitudinally and upwardly movable relative thereto, a steering swivel mounted upon said main frame, a steering lever pivotally mounted upon said steering swivel, a lifting member operatively connected to said steering lever to raise said elevating frame, said elevating frame being provided with surface extending a substantial distance to the right and left from its longitudinal center line and so positioned as to interpose different portions of said surface in the operative paths of said lifting member in accordance with the positions wherein said lever is operated to the right or left of the longitudinal center line of the truck, and means for automatically maintaining connection between said surface and said lifting member while the elevating frame is in its lowermost position and for automatically effecting disengagement of said member from said surface upon upward movement of the steering lever when the elevating frame is in raised position.

17. A lifting truck comprising, in combination, a main frame having supporting and steering wheels, a steering lever provided with a pivotal connection to said steering wheels permitting said lever to be swung in a vertical plane and having a rearwardly extending lifting member, an elevating frame upwardly movable relatively to said main frame and having a lifting contact surface positioned to form a pivotal connection with the free end of said lifting member, one of said pivotal connections being free to move in an arcuate path on either side of the longitudinal center line of the truck as said steering lever is turned laterally to various steering positions, means independent of said lifting member to lock said elevating frame in raised position, and means for automatically maintaining connection between said surface and said lifting member while the elevating frame is in lowermost position and for automatically effecting disengagement of said member from said surface upon upward movement of the steering lever when the elevating frame is locked in elevated position.

18. A lifting truck comprising, in combination, a main frame having supporting wheels and a steering wheel mounted to turn on a vertical axis, a steering lever having a point of connection with said steering wheel and provided with a rearwardly extending lifting member, an elevating frame upwardly movable relatively to said main frame and having a contact surface positioned to afford a point of connection with the free end of said lifting member, one of said points of connection being movable a substantial distance in a horizontal arcuate path in accordance with lateral movements of said steering lever as the latter is turned to various steering positions whereby the parts may maintain operative lifting relationship when said lever is in said various positions, means independent of said lifting member to lock said elevating frame in its elevated position, and means for automatically maintaining connection between said surface and said lifting member while the elevating frame is in lowermost position and for automatically effecting disengagement of said member from said surface upon upward movement of the steering lever when the elevating frame is locked in elevated position.

19. A lifting truck comprising, in combination, a main frame having supporting wheels and a steering wheel mounted to turn on a vertical axis, a steering lever pivotally connected to said steering wheel and provided with a rearwardly extending lifting member, an elevating frame upwardly movable relatively to said main frame and having a surface to make lifting contact with the free end of said lifting member, said lifting member being arranged to be turned horizontally by and with said steering lever a substantial distance without moving out of operative lifting position relative to said surface whereby said elevating frame may be lifted through said lever when the latter occupies various steering positions substantially to one side of its straight forward position, and means for automatically maintaining connection between said surface and said lifting member while the elevating frame is in its lowermost position and for automatically effecting disengagement of said member from said surface upon upward movement of the steering lever when the elevating frame is in raised position.

20. A lifting truck comprising, in combination, spaced supporting wheels, an elevating frame upwardly movable relatively thereto, a draught lever mounted to pivot vertically and horizontally relatively to said frame and provided with a lifting member movable by and with said lever to raise said frame relatively to said wheels, an element integral with said frame for cooperative lifting contact with the free end of said lifting member, the parts being shaped and positioned to permit said lever to be operated at substantial distances to one side of its straight forward position to lift said frame without disengagement of said lifting member from said element, and means for automatically maintaining connection between said surface and said lifting member while the elevating frame is in its lowermost position and for automatically effecting disengagement of said member from said surface upon upward movement of the steering lever when the elevating frame is in raised position.

21. A lifting truck comprising, in combination, a main frame having supporting and steering wheels, an elevating frame mounted thereon for upward movement relatively thereto, elevating and steering means including a lever connected to said steering wheels to guide the same, pivoted to be swung vertically relatively thereto and provided with a lifting member having a rearwardly extending free end, means integral with said elevating frame shaped and positioned to be engageable by said free end of said lifting member, said free end and said last named means being relatively shaped and positioned to permit said lifting member to describe circular movement relative to said last named means without breaking contact therewith as said lever is swung laterally to various steering positions, means independent of said member for holding said elevating frame in elevated position, and means for automatically maintaining connection between said surface and said lifting member while the elevating frame is in lowermost position and for automatically effecting disengagement of said member from said surface upon upward movement of the steering lever when the elevating frame is held in elevated position.

22. A lifting truck comprising in combination an elevating frame, a lifting lever for elevating said frame, and means for connecting together said lever and elevating frame for raising the latter, comprising a connecting element normally tending to move out of connecting position, and means automatically to lock said element in connecting position when said element is moved into that position.

In testimony whereof, I have signed my name to this specification this 10th day of October, 1927.

WILLIAM STUEBING, Jr.